US009990408B2

(12) United States Patent
Sekar

(10) Patent No.: US 9,990,408 B2
(45) Date of Patent: Jun. 5, 2018

(54) SYSTEM AND METHODS FOR INTEGRATED PERFORMANCE MEASUREMENT ENVIRONMENT

(71) Applicant: OpenMetrik Inc., Princeton, NJ (US)

(72) Inventor: Chandra Sekar, Princeton, NJ (US)

( * ) Notice: Subject to any disclaimer, the term of this patent is extended or adjusted under 35 U.S.C. 154(b) by 0 days. days.

(21) Appl. No.: 15/348,856

(22) Filed: Nov. 10, 2016

(65) Prior Publication Data

US 2017/0132300 A1    May 11, 2017

Related U.S. Application Data

(60) Provisional application No. 62/253,553, filed on Nov. 10, 2015.

(51) Int. Cl.
| | |
|---|---|
| *G06F 17/30* | (2006.01) |
| *G06F 7/00* | (2006.01) |
| *G06Q 10/06* | (2012.01) |
| *G06F 17/00* | (2006.01) |

(52) U.S. Cl.
CPC .. *G06F 17/30563* (2013.01); *G06F 17/30572* (2013.01); *G06Q 10/067* (2013.01)

(58) Field of Classification Search
CPC ........ G06F 17/30563; G06F 17/30572; G06Q 10/067
See application file for complete search history.

(56) References Cited

U.S. PATENT DOCUMENTS

| | | | | |
|---|---|---|---|---|
| 7,299,216 | B1 * | 11/2007 | Liang et al. ........ | G06F 11/0727 |
| 2003/0120593 | A1 * | 6/2003 | Bansal et al. ..... | G06F 17/30873 |
| | | | | 705/39 |
| 2010/0318403 | A1 * | 12/2010 | Bottom .............. | G06Q 10/0637 |
| | | | | 705/7.36 |
| 2013/0013552 | A1 * | 1/2013 | Eshleman et al. ..... | G06Q 10/00 |
| | | | | 707/600 |

* cited by examiner

*Primary Examiner* — Kannan Shanmugasundaram
(74) *Attorney, Agent, or Firm* — Changi Wu; Changi Wu Law office

(57) ABSTRACT

A system for integrated performance measurement environment comprises a plurality of distributed file systems; a database, wherein the database further comprises a layout details table, a layout definition table, and at least one raw data master file; at least one network; an extract-transform-load module in a memory; and a business logic module in the memory, wherein the business logic module further comprises metrics catalog and business intelligent plug-in blocks; and a collaboration module in the memory; and methods performing the same including extracting, transforming, and loading data into the system, retrieving data in accordance with rules in metrics catalog and business intelligent plug-in blocks, drilling down the metrics catalog and business intelligent plug-in blocks, and collaborating over the system.

8 Claims, 14 Drawing Sheets

Sales Data Layout (Layout ID: INPUT-01)

| Sno | Measured On | Region | Product | Sales Amount | Overhead | Commission Paid | Commission % |
|---|---|---|---|---|---|---|---|
| 1 | 7-Jul-15 | Europe | iPhone | 29000 | 900 | 300 | |
| 2 | 8-Jul-15 | Asia | Samsung | 18000 | 800 | 250 | |

Warehouse Data (INPUT-02)

| Sno | Measured On | Warehouse | Product | Qty | Wait Days at shelf |
|---|---|---|---|---|---|
| 1 | 7-Jul-15 | Zurich | iPhone | 530 | 32 |
| 2 | 8-Jul-15 | Peking | Samsung | 760 | 34 |

| Layout ID | INPUT-01 | INPUT-02 |
|---|---|---|
| Layout Name | Sales Data | Warehouse Data |
| How Often | Monthly | Monthly |
| Raw Data Owner | John Mayner | George Wagner |
| Source System | SAP | Oracle |
| Script Name | runbatch08 | runbatch03 |
| Email Recipient (notify email) | Emp ID of email recipient | Emp ID of email recipient |
| System Owner | SAP system owner emp Id | Oracle system owner emp Id |
| Support Owner | Support Mgr Id | Support Mgr Id |
| Input Mode | File dropped at Raw Data Share | CSV Upload |
| MD Type (RDMF Data Space name) | RDMF Space 1 | RDMF Space 1 |
| Pre-Processing (Pre-Script Name) | Script to execute BEFORE data upload begins | Script to execute BEFORE data upload begins |
| Post-Processing (Post-Script Name) | Script to execute AFTER data upload ends | Script to execute AFTER data upload ends |

| LAYOUT ID | COLUMN | Friendly Name | Column Type | Internal mapped column in RDMF | User Entered Formula, (Enter ETL commands here) | Converted Formula (expressed in terms of RDMF columns) | Col UPDATE TEMPLATE SQL (dynamic SQL script to update the column) | KPI_YN (is this a KPI Metric column or not?) |
|---|---|---|---|---|---|---|---|---|
| INPUT-01 | A | Sno | Sequence | Seqno | | | | |
| INPUT-01 | B | Measured On | Metric Date | Metric Date | | | | |
| INPUT-01 | C | Region | Attribute | PH_Attr01 | | | | |
| INPUT-01 | D | Product | Attribute | PH_Attr02 | | | | |
| INPUT-01 | E | Sales Amount | Raw Data | PH_datval01 | | | | |
| INPUT-01 | F | Overhead | Raw Data | PH_datval02 | | | | |
| INPUT-01 | G | Commission Paid | Raw Data | PH_datval03 | | | | |
| INPUT-01 | Not given in the file. | Net Sales | Derived Data | PH_datval04 | = (E-F-G) | | | |
| INPUT-02 | A | Sno | Sequence | ISN | | | | |
| INPUT-02 | B | Measured On | Metric date | Metric Date | | | | |
| INPUT-02 | C | Warehouse | Attribute | PH_Attr03 | | | | |
| INPUT-02 | D | Product | Attribute | PH_Attr02 | | | | |
| INPUT-02 | E | Qty | Raw Data | PH_datval04 | | | | |
| INPUT-02 | F | Days in Shelf | Raw Data | PH_datval05 | | | | |

FIG. 4

| LAYOUT ID | This Month File Name | ISN | Metric Date | PH_Attr01 | PH_Attr02 | PH_Attr03 | ... PH_attr "n" | PH_datval01 | PH_datval02 | PH_datval03 | PH_datval04 | PH_datval05 | PH_datval06 | ... PH_datval "n" |
|---|---|---|---|---|---|---|---|---|---|---|---|---|---|---|
| INPUT-01 | July-15:SalesFile | 456 7 | 7-Jul-15 | Europe | iPhone | | | 29000 | 900 | 300 | 27800 | | | |
| INPUT-01 | July-15:SalesFile | 456 8 | 8-Jul-15 | Asia | Samsung | | | 18000 | 800 | 250 | 16950 | | | |
| INPUT-02 | July-15:WhsFile | 579 8 | 7-Jul-15 | | iPhone | Zurich | | | | | | 530 | 32 | |
| INPUT-02 | July-15:WhsFile | 579 9 | 8-Jul-15 | | Samsung | Peking | | | | | | 760 | 34 | |

FIG. 5

LAYOUT DEFINITION SCREEN
Manage Source Data Formats

View / Update Existing Layouts for Source Data

| Layout ID | Layout Name | How often? | Input Mode | File Upload Status |
|---|---|---|---|---|
| ET1494 | SAP Sales Data | Weekly | Batch File | 14 files... click to view details... |
| ET1495 | Oracle GL Data | Monthly | CSV Upload | 9 files... click to view details... |

Insert New Layout (template):

Layout ID: NEW (TBD)  Layout Name: Enter layout name here...

Input Mode: CSV Upload ▽  How often? Monthly ▽

Script to execute PRIOR to loading: Enter Scrip name or ETL commands here...

Script to execute AFTER loading: Enter Scrip name or ETL commands here...

Submit

FIG. 7

LAYOUT DEFINITION SCREEN
Manage Source Data Formats

View / Update Existing Layouts for Source Data

| Col | Column Name | Column Type | Format | Formula/Command |
|---|---|---|---|---|
| A | Seq No | Sequence # | String | |
| B | Metric Date | Measure Date | Date | |
| C | Total Sales Booked | Raw Data | $99,999.99 | |
| D | Total Profit | Raw Data | $ 99,999.99 | |
| E | Net Cost Incurred | Raw Data | $99,999.99 | |
| F | Cost as % of Sales | Derived Data | 99.99% | ( sum(E) / sum(C) ) * 100 |
| G | Region | Attribute | String | |

Add more columns:

| G | | Sequence # | String | |
| H | | Sequence # | String | |
| I | | Sequence # | String | |

Submit

FIG. 8

METRIC DEFINITION

580

Metric Name: [v] Freight/Material Cost Ratio

Executive Sponsor: Woody Eisenberg [v]

Metric Category: Availability [v]

This is a: Goal (Lead) Metric [v]

Aggregation Factor: Sum [v]

Metric Owner [v]

Metric Units: $9,999.99

Map to Balanced Scorecard  Finance [v]

Reporting Interval  Monthly [v]

Map to Qualitative Parameters

Belongs to Strategy: Increase Predictability [v]

Business Process: Critical Situation Assess [v]

YTD review: Yes [v]

Audit Chapter: [v]

Business Unit: Far East Business [v]

Six Sigma Category: Critical to market [v]

Computer Variance: - Select Variance From [v]

Audit Element: Sum [v]

[ Submit ]

FIG. 10

SYSTEM AND METHODS FOR INTEGRATED PERFORMANCE MEASUREMENT ENVIRONMENT

CROSS-REFERENCE RELATED TO RELATED APPLICATIONS

This application claims the priority and benefit of U.S. provisional patent application No. 62/253,553, filed Nov. 10, 2015, which is incorporated herein by reference in its entirety.

BACKGROUND

In a business decision-making environment, the importance and the need to collect metrics to measure business performance is well known and obvious. Metrics are typically computed using raw data collected from multiple source systems, from activities that are usually associated with sales, marketing, finance, supply chain, service efficiency, manufacturing, production, quality, customer care and so on. These metrics are presented in the form of graphs, reports, analytical results, dashboards etc., to senior executives. Senior executives make use of these artifacts for their business reviews, (sometimes referred to as metrics Reviews or operations reviews) so that they can take timely decisions based on metrics to run their business.

Regardless of the type of business and the type of metrics, the process of raw data collection, aggregation, analysis, presentation, and tracking actual performance metrics against target metrics—they all involve the following five stages: a) Data collection, data aggregation and cleansing, b) Storing raw data and metrics in a data warehouse or metric data mart, c) Organization of metrics, according to business impacts and rules, d) Using Business Intelligence (BI) tools to create graphs and reports and dashboards, and e) Collaborating among peer managers and leaders and discussing business impacts, raising issues, throwing action items, tracking milestones to achieve target metrics etc.

Today, the Industry makes use of five distinct types of tools to achieve every stage above. Different variations of the five types of tools may exist, whereby some steps are either skipped, or performed by the same tool, or some stages are done manually to fill the process gaps. It is important to note that these five steps are accomplished largely with the help of programming using developers, not the end business user. The above five stages are explained in detail below.

Stage 1: Data aggregation and cleansing: also known as extract, transform, and load (ETL), currently accomplished only by ETL development tools run by professional programmers, not directly by end users or novices without programming knowledge.

Stage 2: Data warehousing or data mart: every enterprise builds its own customized data warehouse or logical data structure specific to their organizational needs using well-known relational database management systems (RDBMS).

Stage 3: Organizing a cascaded set of metrics: defining the relevant set of metrics, and cascading them from Key Performance Indicators (KPI metrics), down to detailed tactical levels of metrics measurements. Metrics are also mapped to business drivers, risks, business functions and business priorities, as well as attributes like organization, product service, geographic regions etc. Every metric is mapped to respective metric owners who are responsible for delivering to that metric, as well as metric consumers (or users) authorized to access the metric. In addition, should a metric fall outside the allowed band or Red/Yellow/Green limits defined, appropriate notification and alerts such as emails and escalation chains get sent out.

Stage 4: Use of Business Intelligence (BI) tools for the construction of graphs such as time-based trend charts, pie charts showing metrics sliced by attributes (such as revenue per business unit, sales by region, sales by product etc.,). End users may desire a variety of visualizers such as stacked column charts (graphical representation of pivot tables) or two-dimensional grids or three-dimensional cubes for their decision-making purposes. Furthermore, dashboards comprising one or more such charts are constructed along with necessary data grids. The dashboards in turn offer the ability to drill down from top levels to lowest level transactions that led to the metric. Such drill downs generally fall into at least one or more of three ways: time-based drill down (for example, drill down from quarterly sales to monthly breakdown and then drill down to sales by week) or attribute-based drill down (for example, Europe revenue broken down by countries within Europe, or Europe total revenue broken down by products) or component-based drill down, such as from a total revenue into its components (total Revenue=gross revenue plus carry over payments, minus adjustments, minus tax etc.). In current market, the above tasks of construction of charts, compilation of charts into dashboards, and the ability to drill down to details are typically done by developers. It is important to note that many variations of these drill-down capabilities are created by developers specific to their organization. There exists no configurable, off-the-shelf function that can be done on the fly, ready to be used by end users, with automatic, intuitive drill-down capabilities. Stage 5: Collaboration: Once the charts and dashboards are developed, they are routed to appropriate end users specific to the business function. The user then may choose to collaborate with peer business associates and take appropriate actions or responses. Some commonly used collaboration methods could be: the ability to send and receive comments, to raise formal issues, to route them and escalate them to appropriate levels and resolve them, to take appropriate action items, and to track the successful execution and completion of action items, define and track milestones to achieve metric targets, and in some cases even attach to a formal Root Cause Analysis process. Today largely, this process is in isolation from computer tools, and it is predominantly by manual. In a nutshell, it is important to note that all of the above five stages are meant to be part of a process to get raw data to the boardroom as a meaningful set of Key Performance Indicators (KPI) metrics. But today, the process to get raw data to the boardroom are executed in silos, using software developers having expertise in different development toolboxes (for example, ETL tool comes with a developer toolbox, RDBMS is a data repository toolbox for database developers and administrators, business intelligent tool is a charting toolbox for developers in developing graphs).

It is important to note that these five stages cannot be done by end users, since they are not trained of the development toolboxes nor do they have programming knowledge. As one might note, there is no single, comprehensive, end-to-end solution that exists, especially that which can be set up, monitored and used directly by end users, without programming intervention, either to setup or to operate. Instead, many enterprises implement custom solutions, or metrics initiatives, each specific to their organization, specific to their business need, by combining functionalities of these five layers of tools. Thus, invariably, such glued frameworks end up as a mixed bag of five layers of heterogeneous systems. Consequently, they place a heavy burden and continued dependence on information technology (IT) Subject Matter Experts (SMEs) for ongoing development, support and enhancement. In current information metrics systems, there is no general purpose, configurable, end-to-end web-enabled, automated solution that can serve not only as a metrics collection, storage and reporting tool, but serve as a two-way conduit for communication and collaboration. In essence, an integrated metrics-driven management control system does not exist.

The unavoidable need to use of five types of tools is not without reason. So far, the industry has not been able to visualize and combine these five stages into a cohesive unit that can be setup, operated and used by end users, without programming assistance, because: In every case, the underlying source data structures are different. In every organization, the different business functions have their own systems, each having its own relational data structures unique to serve its needs. Therefore, aggregating metrics from those systems also ends up as a custom aggregated data mart for metrics. There has not, thus far been a universal data warehouse which can take the place of relational data structures, as a generic, denormalized equivalent. Nor did emerge a "universal data warehouse" that is configurable by the user, so that the user can define a set of metrics, define rules and store data for the metrics, along with drillable data from multiple sources. Historically, the adherence to "Logical Data Model" principles, such as referential integrity, foreign keys, normalization etc., resulted in a huge set of "relational tables" that are interconnected via foreign keys, links, joins and relationships. In addition, such large set of tables would require complex SQL statements, unique to every query. Practices such as "cost optimization", "space optimization" got into the realm of SQL, to save storage, but unable to produce faster results, since the SQL has to access many inter-related tables via joins and sub-queries anyway. So, decades ago, database designers came up with a practical design compromise called "denormalization" technique. This Denormalization exercise was done by database designers, AFTER they came up with the ideal "logical data model". While it is still an accepted industry practice, every "denormalized model" was unique pertaining to the nature of the application. SO far, a generic denormalized model that can accept ANY logical data model as input has not emerged.

Even though ETL commands exist, they serve more as APIs or used by developers interactively through screens. For every data coming from every source, the ETL developer has to map via ETL tool, to a specific target in the data warehouse, custom designed for the organization. So far, there are no ETL command sets that the user can give on his/her own, mapping to a generic, universal data structure. Even though business intelligent (BI) tools can create "BI charts" that can be dragged and dropped into dashboards by developers, still the data grids and corresponding "drill downs" and other intelligent "analytics possibilities" have to be pre-coded and put in a platter by the developers as "analytics visualizers" and handed over to end users. Once they get such "analytics visualizers", end users can operate them in seemingly quasi "self-service" mode, but ONLY within the confines of slice, dice and narrow possibilities offered by the developers. To use object-oriented analogy, even though charts exist, there are no "BI plug-in" intelligent reusable objects in existence, that are not only charts, but also contain data grids, and drill down information and metrics alerts. Therefore, the user cannot come up with a new set of metrics, design his/her own visualizers, that can be put together like building blocks to construct dashboards that can automatically offer drill down to the raw data levels.

End users have not been able to create and organize metrics and tie them to the raw data via computations, and configure them as "BI plug-in" objects. They have not been able to attach further "business collaborative intelligence" to the charts, as reusable objects, so that the objects carry the pointers to comment threads, issues, action items, milestones and root cause analysis processes. Neither have they been able to create and conduct meetings online, where the meeting agenda comprises the status of the collaboration mentioned above. Nor have they been able to automatically create meeting minutes—and store them for later use, such as for Legal compliance.

An end-to-end "metrics governance process" need to consist of a single cohesive platform with at least two components: a) to collect, compute, report on metrics and to collaborate and b) to take business decisions as a "closed business control loop".

To design such a management control system involves addressing these possibilities: What if there exists a "universal denormalized database structure" that can readily accept sets of source data files into one simplified target relational data model? What if there exists an "end-user friendly" set of ETL commands and an ETL parser that can load a plurality of source data, into the above "universal data warehouse"? Assuming such a "universal data warehouse" can be populated directly by the user by the ETL commands, what if there exists a set of "BI plug-in" reusable objects that have "true business intelligence" built-in, (charts, data grid, drill down, metric alerts, collaboration—all in one) What if such a BI object can offer intuitive automatic drill down capabilities in many ways, depending on the raw data and the pertinent dimensions? On the other side, what if there exists a relational data model to define and organize metrics, according to business relevance, and with rules for allowed band limits and red/Yellow/Green conditions? What if every such metric can be tied to the raw data and/or derived data or aggregate expression from the universal data? And what if one can pass that metric as a parameter to the BI plug-in object mentioned in (3) above? 7. Bringing all of the above together, what if there exists a mechanism to establish many pointers or link-ids from each one instance of the "BI plug-in" object, link the object to comment threads, or to issue resolutions, or to an action item tracking system, or even to Root Cause Analysis system. The above questions resulted in formulating this invention.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims. The subject matters of this application overcomes the aforementioned problems and is directed to a system for integrated performance measurement environment comprises a plurality of distributed file systems storing a plurality of raw data sources; a database receiving a plurality of raw data from the plurality of raw data source and assigning a plurality of attributes to the plurality of raw data, wherein the database further comprises a layout details table, a layout definition table, and at least one raw data master file; at least one network capable of transmitting the plurality of raw data from the plurality of raw data source to a process device; an extract-transform-load module in a memory of the process device, which extracts, transforms, and loads the plurality of raw data into the database in accordance with a set of instructions in the extract-transform-load module; a business logic module in the memory of the process device, which comprises a plurality of metrics catalog and a plurality of business intelligent plug-in blocks to retrieve, filter, aggregate, convert, and display a plurality of data stored in the at least one raw data master file; and a collaboration module in the memory of the process device. The invention is also directed to methods for method for integrated performance measurement environment comprising extracting, transforming, and loading data into the system, retrieving data in accordance with rules in metrics catalogs and business intelligent plug-in blocks, drilling down the metrics and business intelligent plug-in blocks, and collaborating over the network and the system.

BRIEF DESCRIPTION OF THE DRAWINGS

It should be understood that the drawings are merely representative, are not necessarily drawn to scale, and are not intended to limit the subject matter of this application.

FIG. 2a illustrates one of the embodiments for a raw data source to be extracted, transformed, and loaded into one embodiment of the subject invention.

FIG. 2b illustrates one of the embodiments for another raw data source to be extracted, transformed, and loaded into one embodiment of the subject invention.

FIG. 3 illustrates one of the embodiments of the Layout Definition table of the subject invention.

FIG. 4 illustrates one of the embodiments of the Layout Details table of the subject invention.

FIG. 5 illustrates one of the embodiments of the Raw Data Management File (RDMF) table of the subject invention.

FIG. 7 illustrates an exemplary graphical user interface for user's definition of layout of raw data source in accordance with an aspect of the subject invention.

FIG. 8 illustrates another exemplary graphical user interface for user's definition of layout of raw data source in accordance with an aspect of the subject invention.

FIG. 10 illustrates an exemplary graphical user interface for user's definition of metrics catalog in accordance with an aspect of the subject invention.

DETAILED DESCRIPTION OF THE PREFERRED EMBODIMENT

Figure 1:
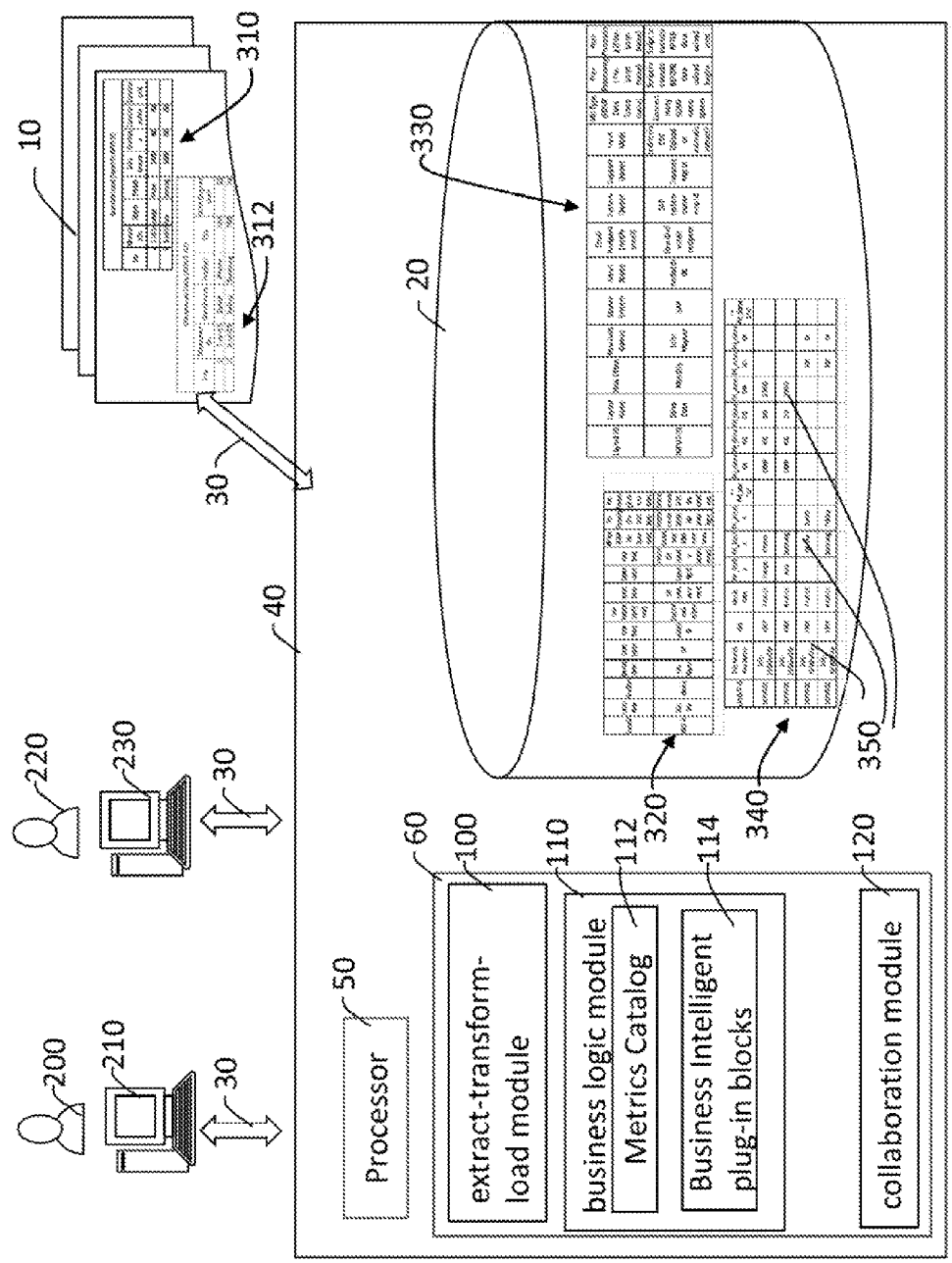
FIG. 1 is a schematic diagram of a system for management control components in accordance with an aspect of the subject invention.

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between stated value or intervening value in a stated range and other stated or intervening value in that stated range is encompassed within the invention. The upper and lower limits of these smaller ranges may independently be included or excluded in the range, and each range where either, neither or both limits are included in the smaller ranges is also encompassed within the invention, subject to specifically excluded limits in the stated range. Where the stated range includes one or both of the limits, ranges excluding either or both of those included limits are also included in the invention.

Other than in the embodiment or example, or where indicated otherwise, all numbers indicating ingredient quantities and/or reaction conditions are to be understood as being modified in every instance by the word "about," which means the ingredient quantities or reaction conditions are within 10 percent to 15 percent of the indicated value.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

FIG. 1 illustrates a preferred embodiment of the system comprising: (a) a plurality of distributed file systems 310 storing the plurality of raw data sources 10; (b) a database 20 receiving a plurality of raw data 310 from the plurality of raw data source files 10 and assigning a plurality of attributes to the plurality of raw data 310, wherein the database 20 further comprises a layout details table 330, a layout definition table 320, and at least one raw data master file (hereinafter, RDMF) 340; (c) at least one network 30 capable of transmitting the plurality of raw data 310 from the plurality of raw data source files 10 to a process device 40; (d) an extract-transform-load module 100 in the memory 60 of the process device 40, which extracts, transforms, and loads the plurality of raw data 310 into the database 20 in accordance with the set of instructions in the extract-transform-load module 100; (e) a business logic module 110 in the memory 60 of the process device 40, which comprises a plurality of metrics catalog 112 and a plurality of business intelligent plug-in blocks (hereinafter referred to as BI plug-in blocks) 114 to retrieve, filter, aggregate, convert, and display a plurality of data 350 stored in the RDMF 340; and (f) a collaboration module 120 in the memory 60 of the process device 40. The first user 200 through a computer with display 210 can define the rules in the extract-transform-load module 100, which give the instructions to the process device 40 regarding how to extract and transform the raw data 310, and load the raw data 310 into the raw data master file 340, which becomes the plurality of data 350. The user 200 also can define the business logic module 110 regarding the metrics catalog and the "BI plug-in" blocks to retrieve, filter, aggregate, and convert the plurality of data 350. The process device comprises a processor 50, at least one memory 60, and at least a database 20.

The plurality of metrics catalog defined by the user fall into one of three kinds, expressed in terms of raw data master file (RDMF) 340. The three kinds are: 1) The plurality of metrics catalog could be simply the raw data 310 itself, for example sales, revenue etc., which are line items, to be summarized over week, month, quarter etc., and sliced and diced by store, product, region etc., which are attributes. 2) metrics catalog could be computed or derived data from a plurality of raw data 310 as a formula and got stored in RDMF 340 during data upload into the RDMF 340. 3) The plurality of metrics catalog could be an aggregate expression, which is a formula that can return a number, which is not stored in RDMF, but computed on the fly. The presentation of derived data or aggregate expression could be, for example the net sales booked, which gross sales minus commissions, minus returns, minus recoveries, minus taxes. The BI plug-in blocks 114 contained within business logic module 110 contain the input and output parameters. The business logic module 110 may comprise external keys or link identifications or pointers to connect to, but not limited to, comment threads, issue escalation, action items tracking, milestones specific to the metrics catalog 112 containing metrics definitions and rules and/or the BI plug-in blocks 114. Under the business logic module 110, the user 200 or the other user 220 can drill down the aggregated data to the components of the aggregated data. Through the collaboration module 120, the user 200 and the other user 220 can collaborate by attaching link ids or pointers to collaborative acts such as comment threads, issue escalation systems, action item tracking, milestone status tracking and Root cause analysis processes, connected to the BI plug-in blocks.

In one of the embodiments the system comprises distinctively separate modules or Hubs (aka Portals) for Metrics Definition, Metrics Data Upload, Feeder Systems monitoring, Do-it-yourself (DIY) dashboards, Meeting Hub, etc., all corresponding to the modules 100, 110, 120 in FIG. 1.

FIG. 2a and FIG. 2b illustrate two examples of a plurality of raw data 310 and 312 in the raw data source files 10. FIG. 2a contains sales data from different regions (continents) for different products, such as cellphones of iPhone® and Samsung®, and the sale dates with the commissions (product sale layout). Note that Samsung® is the trademark owned by Samsung®. Note that iPhone® is the trademark owned by Apple®. In FIG. 2b, on the other hand, the plurality of raw data 312 contains information about the products in the warehouse (product warehouse layout), their shelf life and the overhead cost. Those two raw data sources 310 and 312, the sales data and warehouse data, are to be transferred into the raw data master file 340 within the database 20.

FIG. 3 illustrates an example of the Layout Definition table 320. It may comprise the data 324 from sales data 310 (FIG. 2a), warehouse data 312 (FIG. 2b) and their associated column name 322: "LAYID," a sequence number that defines the LAYOUT; "LAYOUTNAME," the name of the layout, for example, "MONTHLY PRODUCT SALES"; "MDTYPE," a column defining the Master Data Space; "LAYOUTDESC," a comment field; "HOWOFTEN," the frequency of updates to the raw data, for example, monthly, weekly, daily, intra-day, or hourly; "INPUTMODE," an indication of whether the data is going to be loaded via CSV manual upload, or automatic etc.; "SCRIPTNAME," an indication of the loader script that will be called which will load the data automatically; "SOURCESYSTEM," an indication of ftp or server DNS name; "RAW DATA OWNER," person's name email, phone etc. of the person in charge of the generation of the raw data; "SYSTEM OWNER," person's name email, phone etc.; "SUPPORT OWNER," person's name email, phone etc.; "PRE-SCRIPT NAME," an indication of the program or ETL function call to be executed prior to data loading, such as special data cleanup and notifications; "POST-SCRIPT NAME," an indication of the program or ETL function call to be executed after data loading, such as special data cleanup and notifications; "NOTIFYEMAIL," an indication of the email to notify a person in case of data upload errors.

In one of the embodiments, Layout Definition table 320 comprises Input Data Scheduler/Monitor, Input Data Error Reporting and Alerts, Data Extraction Rules Engine and User-defined Events processor, to gather information related to Layout Definition table 320.

FIG. 4 illustrates an example of the Layout details table 330. It may comprise the values 334 first raw data source 310, the value 336 from the second raw data source 312 and associated column 332: "LAYID," the foreign key from the Layout Definition table 320 (FIG. 3); "LAYDETID," a sequence number that defines a detail record; "COLORDER," an indication of the column number or column header like in raw data source, such as column A, column B in a spreadsheet; "COLNAME," header name of the columns in the raw data source file, such as store location, product, sales serial number etc., which is the friendly name for column A or B or C as appropriate; "COLTYPE," an indication of whether the column is either UNIQUE IDENTIFIER, ATTRIBUTE, RAW DATA, DERIVED DATA, AGGREGATE EXPRESSION, FYI BIG, FYI SMALL, FYI BLOB (comment fields of different types), RECORD KEY etc.; "DATATYPE," indicating if this is money column String, or number and how is to be formatted, applicable only if the COLTYPE above is either RAW DATA, DERIVED DATA or AGGREGATE EXPRESSION;

"VALIDSCRIPT," storage of the script for ETL formula expression if RAW DATA or DERIVED DATA or AGGREGATE EXPRESSION exists; "RDMFCOL," an assignment of the designated columns in RDMF in accordance with columns in raw data source, which is a mapping of friendly name given in column name to the internal storage in RDMF; "RDMFFILE:" a reservation for recording multiple RDMF files in case of large databases exceeding a single system's processing limits; "COLFORMULA," aggregation or data manipulation formula in friendly notation, which would convert the user friendly formula into RDMF internal columns; "COL UPDATE TEMPLATE SQL," storage of the actual UPDATE statement template, such as like this:

```
UPDATE RDMF O
SET $TargetField$ = (
    SELECT TRUNC ( $COLFORMULA$, 2)
    FROM $LIST_OF_TABS$
    WHERE 1=1 $LIST_OF_ANDS$
)
, WHERE FILENAME = '$FILENAME$'
```

The tags enclosed between $ signs, $TARGETFIELD$ representing the target RDMF column that needs to be updated, $COLFORMULA$ indicating the value from COLFORMULA column above which as the SQL expression that calculates the commission, $LIST_OF_TABS$ representing the dynamic views that are created, that give the impression that it is a relational data model. But, note that all of the dynamic views actually map back to the single RDMF 340; this UPDATE statement making the dynamic computation in real time, across all data sources; $LIST_OF_ANDS$ computing based on RECOD KEY name match and that creates the dynamic join, which the user would otherwise have to create manually for every update; the tag $TargetField$ would be replaced by RAW_DATA_002, which may represent, for example, the commission field, assuming product sale layout are uploaded; In that case, the tag COLFORUMAL would be replaced by RAW_DATA002*0.03 for 3% commission; the tag $LOST_OF_TABS$ would be ET1001 which represents the view name that logically looks only at the records of this PRODUCT SALES layout for selective update. The tag $FILENAME$ represents the new data that came in this month August. Aug0216.xls. Only those rows in the product sale layout that correspond to July month would be updated, since the July records came in on August 02 at midnight; and "KPI_YN," indicating, from a business perspective, if this is a Key Performance Indicator.

In one of the embodiments, the extract-transform module 100 and the Layout Details 330 are called as ETL formula parser and validator.

FIG. 5. illustrates an example of the RDMF 340 containing all denormalized data 344 from first raw data source 310 and the denormalized data 346 from the second raw data source 312 and the attributes 342 associated with the data. The denormalized table RDMF 330, fully retains the originality of the data that came from the plurality of raw data sources 310.

The benefits of such denormalized raw data master file holding entire raw data include, but not limited to: (1) the user need not to construct a logical relational database for each use; (2) the user can simply import raw data in different layout formats, from different sources; (3) the user need not consider referential integrity and constraints and avoid any programming in that regard; (4) it constructs a single, unified data structure that is applicable to various business scenarios; (5) the user need not prepare user's own data with programming efforts; (6) the user need not write conventional ETL code to specify formulas, aggregation and cleanup; (7) entire data governance is done by end users without programming using query languages since there is no need to explicitly join data scattered in different tables; (8) entire alert mechanism to different owners is done via a single structure; (9) it also allows easy data validation, OUTLIERS, REJECTS processing etc., directly by the user without programming knowledge.

As shown on FIG. 5, RDMF 340 has predefined columns, which are grouped as (1) "UNIQUE IDENTIFIERS": RDMF 340 has columns, but not limited to: "sequence number," a unique number that identifies this record; "Measurement Timestamp," the time that this record corresponds to, for example, if the record is a sales summary record for the month of July 2016, the measurement timestamp would be July 2016; "Timestamp," the time that this record was successfully loaded into RDMF, for example, if the July 2016 sales record was loaded into the system on August 2nd night 12:37 AM, that timestamp is represented here; "Source," this field is for recording where the data came from. It could be from an excel file, or it could be from a csv file, or via ftp or via WEB services feed, for example, it could be sap080216.xls an excel file created by SAP007 system, or coming from ftp://101.01.01.89 or it could be from a batch program BAT080216; this tells the process device where the data came from and loaded into the RDMF 340; "Source layout name," indicating the record layout of the incoming data set, for example if the user is loading Financial General ledger data, then it would have FINGEN_EUROPE_GL as the name where FINGEN_EUROPE_GL indicates that the financial General Ledger coming from Europe; if the user is getting a slightly different layout, from ASIA, which has fields different from EUROPE, then those records will be prefixed with the source layout name FINGEN_ASIA_GL. The user can also upload Supply Chain invoice data, and it will be loaded into the same RDMF 340 and those records will be marked with SC_EUROPE_INV layout. It is assumed that the user has already predefined the Layout Definition table 320 and Layout Details table 330 templates; "Source Layout Type," indicating whether it is a transaction data, product Master table etc., or other reference table.

The second group of columns in the RDMF 340 is "ACCESS RULES," to store information like: "DATA OWNER/SPONSOR," the contact for the supply of data, and data errors in loading the RDMF 340. It could be the employee id, email and phone number of the person. "BUSINESS OWNER/SPONSOR," could be the employee id, email and phone number of the person. "SUPPORT CONTACTS," could be the employee id, email and phone number of the person. "CRUD," acronym for create, retrieve update, delete flags.

The third group of columns in the RDMF 340 is "OUTLIERS/REJECTS FIELDS," including columns like: "OUTLIER FLAG," an indicator of Yes/No. Based on the ETL commands specified by the user during loading, if the record was in fact flagged as an outlier. For example, the user may not want to load records that involve sales less than 2 dollars. However, the user may want to keep the record just to indicate how many sales transactions happened; "OUTLIER REASON," a short explanation for why the record was flagged as an outlier. "REJECT FLAG," an indicator of Yes/No. In some cases, the user may want to reject the record if it has a blank. Or, the user may want to reject a record if it has an invalid country code. "REJECT REA- SON," a short explanation for why the record was flagged as a REJECT. Third group is ATTRIBUTE FIELDS: "ATTRIBUTE CODE," indicator for the "dimension" or the qualifier that the data pertains to. For example, if the user is inputting sales figures for Paris, the word Paris would go here. If the user is giving sales figures for iPhone 7 Plus, then the product iPhone Plus would go here. "ATTRIBUTE PARENT," an indicator of the hierarchy of the code. For example, in case the code was Paris, then the word 'France" would be entered here. If the user has entered iPhone 7 plus in ATTRIBUTE CODE, then "APPLE" would be entered here as a parent. "ATTRIBUTE CATEGORY," an indicator of the CATEGORY that it belongs to. For example, the word "GEOGRAPHIC REGION" would be entered here as a category, if France and Paris was entered in the above two fields. The word "MOBILE DEVICES" would be entered here if the above two fields contained APPLE and iPhone 7 Plus. "RAW_DATA FIELDS, "This is a placeholder for the raw data. For example, if the raw data was a sales figure $29,000, this would contain 29000 as an unformatted number. Other examples might be: number of returned merchandise, a time value when a patent was admitted into ER, a temperature of a furnace, a Boolean value 0/1 for true or false etc. In RDMF 340, the columns are as RDVAL001, RDVAL002 etc. Like that, 100 "placeholder sets" are created.

Depending on the size of the implementation, the number of placeholders might be 20, 50, 100 or 200 and so on. The number of placeholders depends upon the users' expectation of how many attribute dimensions to pre-allocate, how many raw data placeholders to pre-allocate etc.

Another group of columns in RDMF 340 is the DERIVED DATA FIELDS. DERIVED DATA FIELDS are also named as RDVAL013, RDVAL009 etc., and they are given physical storage allocation in the RDMF 340. With one difference. They are derived, based on calculation rules specified by the customer/end user. For example, the incoming sales record may have sales figure $29,000 as the sales. In the LAYOUT DEFINITION, the user may have entered a Commission field, as a derived field and entered a 3% sales commission as the formula. In that case, upon data loading, the system will automatically compute and populate this RDVAL013 field with the commission amount. In RDMF 340, it has created columns as RDVAL001, RDVAL002 etc. as a placeholder. In these derived fields, the user can give formulas or (extract, transform, and load) ETL commands without a need for programming. As shown in FIG. 8, the Graphical User Interface 490 provides column 492 allowing user to define their ETL commands 494, such as (sum(E)/sum(C))*100 to calculate the cost as percentage of sale. Here the sum(E) refers to the sum of cost incurred which is given in column E 496 of the source file divided by sum(C) which refers to the sum of total sales booked is given in column C 498 of the source file.

Another group of columns in RDMF is COMMENTS FIELDS. These columns are placeholders for storing text and Binary Large Object Storage (BLOB) that holds image jpeg files, or even links or pointers to web sites, jpg files, image files etc.

Another group of columns in RDMF 340 is RECORD KEY, where unique identifier is the record carries. For example, it could be the Patient ID, or Account number or Service Ticket number. The columns, USER_KEY001, USER_KEY002 etc., are as placeholders for this purpose, for example, up to 10 such keys per record. In traditional relational database management system, the primary key and the foreign keys are used to join tables. Here the method and the system has done generic, master denormalization, where it has automatically joined data (not from different relational tables, but different rows from one RDMF master table) for the user, without a need for development. It is important to note that, once the user specifies more than one RECORD KEY, then they become concatenated keys, and will be used as such, without explicit programming.

Another group of columns RDMF 340 is RECORD LOCKS: these three columns are for locking: LOCKING USER, LOCK TIME, LOCK MODE (to update a single field or multiple fields, as a comma separated value string of columns).

Another group of columns is for aggregate expressions. The aggregate expressions, as the name suggests, are just expressions, and therefore they are pseudo columns. It is important to note that there is no storage allocated in RDMF 340 for aggregate expressions. They are mentioned here only for the purpose of completeness. They are mentioned here since they can be accessed in the same way as Raw Data and Derived Data in SQL expressions and in ETL commands. For example, if there is a situation that two sales transactions, of two different products, by two different salespersons, in two different outlets of the same Retail company, how does the system work to compute the commissions? Since the RDMF stores the data in appropriate attribute columns, in which same column for sales no matter what source system it came from, the user can simply write out an "aggregate expression" that instruct the system to calculate "sum(commission)/sum(s) %" and the system internally issues a "dynamic SQL" query the appropriate columns in SELECT, attaches the appropriate WHERE conditions, and also summarizes the calculations by any product, region, store, salesperson etc., So, four major differentiating factors: 1. Aggregate expressions do not require programming, they can be specified by the user. 2. They do not need storage allocations in the RDMF, since all calculations are done on the fly. 3. The aggregate expression can be marked as a "Business Metric" and attach alerts/limits and Red/Yellow/Green conditions which will be displayed on the fly. 4. A user can do n-way drill down from them without specific computer coding training.

Figure 6:
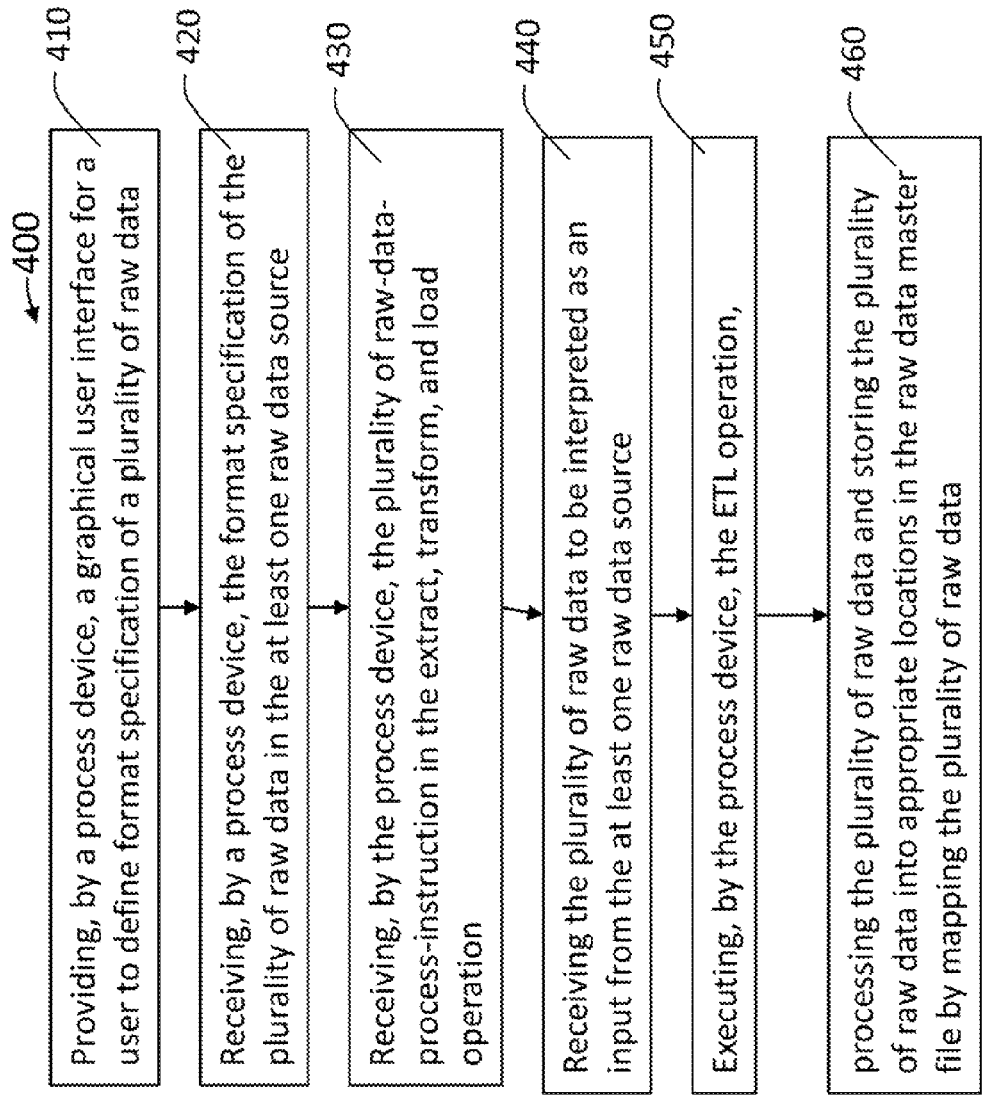
FIG. 6 is a flow chart diagram of a method for the extract, transform, load (ETL) operation process in accordance with an aspect of the present invention.

FIG. 6 illustrates a flowchart of a method 400 for receiving data from a plurality of data sources 310, transforming them according to the ETL rules specified by the user in layout definition table 320 and layout details table 330, and storing them into RDMF 340.

In act 410, providing, by a process device a graphical user interface 480 (FIG. 7) and 490 (FIG. 8) for a user to define format specification of a plurality of raw data to specify the format specification of the plurality of raw data in at least one raw data source, on the at least one graphical user interface 480 and another at least one graphical user interface 490, the user 200 (FIG. 1) defines the format specification of the raw data source in the layout definition table 320 (FIG. 4), which comprises the layout identification for the raw data source, the name of the data source, the update periodicity, the raw data owner, the data system producing the raw data source, and the file name of the raw data source. The user 200 also defines the corresponding columns of the raw data source into the Layout details table 330 (FIG. 3), such as the order of column in the raw data source, the friendly name of the column in the raw data source, the column types of the raw data source. At the act 410, the process device 40 (FIG. 1) identifies the appropriate internal mapped columns in the RDMF and records them into layout detail table 340 (FIG. 5). At act 410, the user identifies the column type of the plurality of raw data: if it is an attribute, raw data, comment column, record key, derived data or aggregate expression. Based on the column type, and ETL set of commands as given in VALIDSCRIPT column, act 420 performs ETL actions as appropriate. For example, if a raw data is defined as "parent attribute" and the one next to it is a child "attribute", then it allows the parser to treat the combination of a tree of hierarchical "parent-child relationships". In one source record, an attribute combination might be "Europe" followed by "France". In another source data record, the same attribute combination might say "France" followed by "Paris". The parser then knows to "treat" them as "parent-child relationship" and issues the automatic "tree-structured SQL" query, without the need for programming. This is possible since the format of the Structured Query Language (SQL) is known ahead of time since the Internal RDMF mapping columns are known, the process needs to just receive the value "Europe" and it will automatically trace down the tree and get all appropriate Sales numbers for every child and grandchild and so on. This is accomplished without the need for programming.

At the act 420, receiving, by a process device, the format specification of the plurality of raw data in the at least one raw data source, wherein the plurality of raw data comprises at least one row, at least one column, and at least one value in accordance with the at least one row and the at least one column, wherein the format of specification comprises a plurality of rules for an extract, transform, and load (ETL) operation, the format specification of the plurality of raw data in the at least one raw data source, wherein the plurality of raw data comprises at least one row, at least one column, and at least one value in accordance with the at least one row and the at least one column, wherein the format of specification comprises a plurality of rules for an extract, transform, and load (ETL) operation, the upload parser in the ETL operations receives those instructions stored in the act 410 and process the data in accordance with the format specification stored in the Layout details table 330 as shown in FIG. 3.

At the same act 420, the user defines, but not to program or to write coding, the format specifications, which will solve the current issues existing in the relational database management systems that the format specification needs to be done by professional programmer since the complexity of the normalized data tables.

At the act 420, prior to reading the raw data source file, ETL operation performs "file level" ETL functions that the user has defined such as rejecting files, sorting columns in files containing the raw data sources, alerting designated person for errors in the files, or alerting designated person for conditions set by the user.

At the act 430, receiving, by the process device, the plurality of raw-data-process-instructions in the ETL operation, wherein the plurality of raw-data-process-instruction comprises the plurality of rules to reject an abnormality in the raw data and alert a user for the abnormality in the raw data, the, the plurality of raw-data-process-instructions, or ETL commands, might be the rules to reject the entire record, if the raw data was null or blank. For example, the Region field, instead of saying Europe or Asia, may simply be empty, due to data input error at the source. In such a case, either a default value of "USA" could be placed in the empty slot and an alert could be sent to the data owner or, the entire record could be marked as rejected. Thus, one function of ETL might be to detect abnormality in the raw data and alert a user for the abnormality in the raw data and take corrective action. Another example might be to do a calculation of Commission Amount from another column multiplied by commission % allowed, which is given in yet another column.

At the act 440, receiving the plurality of raw data to be interpreted as an input from the at least one raw data source, the process devices access the plurality of raw data.

At the act 450, executing, by the process device, the ETL operation, wherein the ETL operation further comprises an extract process comprising selecting from the plurality of raw data, one or more transformation processes to aggregate and formulate the plurality of raw data, and a load process comprising loading the plurality of raw data into a raw data master file by an order of the at least one row of the at least one raw data source in accordance with the format specification of the plurality of raw data; the ETL operation reads the plurality of raw data from the at least one raw data source file contents, row after row, then the ETL operation reads the format of specification from the Layout Definition Table 320 (FIG. 3) that describes the template of the raw data source files. Subsequently, the ETL operation also reads the Layout Details table 330 (FIG. 4) that describes every cell of the row, and the corresponding mapping column in RDMF 340 (FIG. 5) that it needs to write the data into.

At the act 460, processing the plurality of raw data and storing the plurality of raw data into appropriate locations in the raw data master file by mapping the plurality of raw data, and a plurality of attribute associated with the plurality of raw data into a prebuilt data dictionary structure, the ETL operation performs cell level ETL functions that the user has defined, which is reading and computing the raw data in accordance with the derived Data formula designated by the user in the Layout details table, and then writes into the corresponding mapping columns in the appropriate target row in appropriate columns in RDMF. Finally, it will do file level ETL functions on the RDMF that the user has defined after loading the raw data into the RDMF.

In one of the embodiments, the act 400 also involves source data rollback, source data timing validation and layout dependency checking to eliminate cyclic redundancies among layouts.

Figure 9:
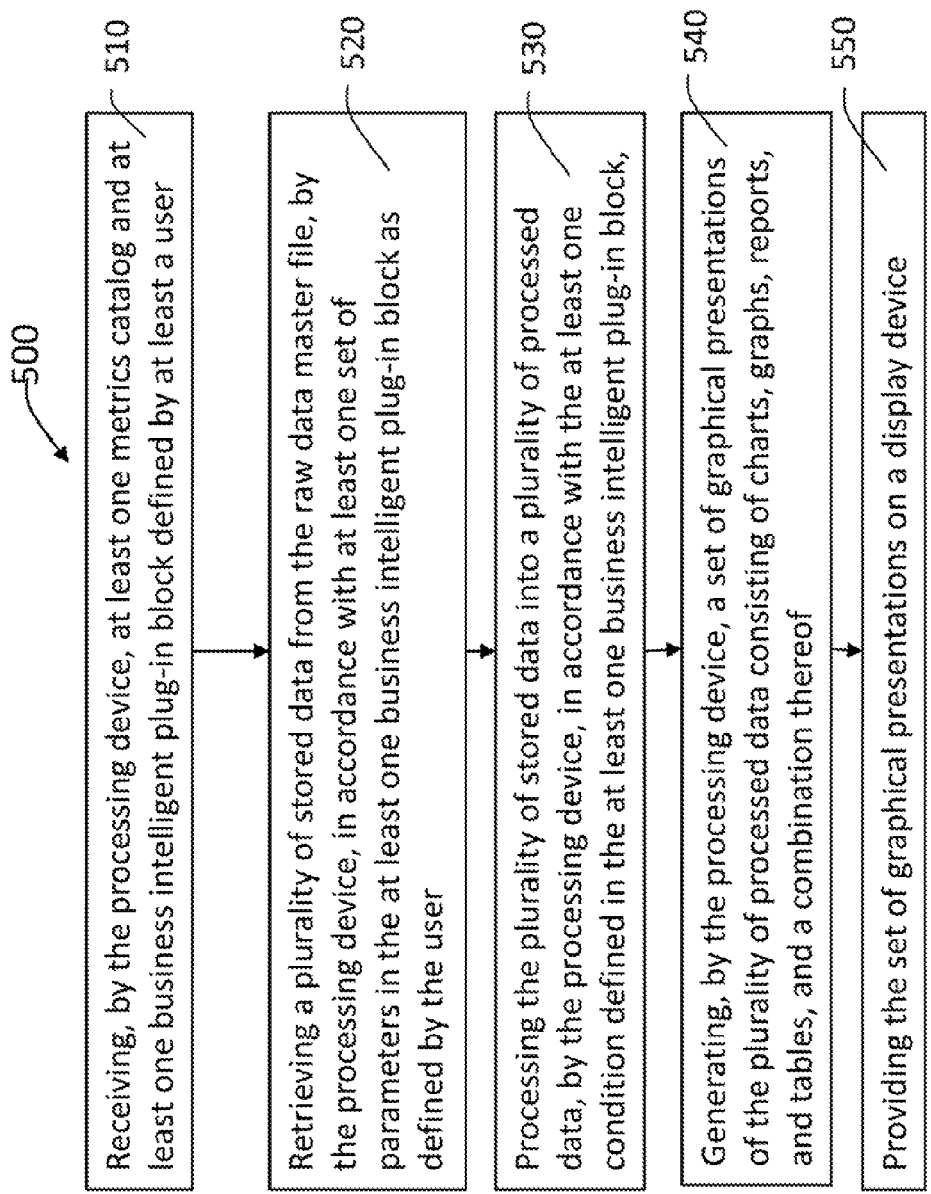
FIG. 9 is a flow chart diagram of a method for the defining and operating metrics catalog and business intelligent plug-in blocks in accordance with an aspect of the present invention.

FIG. 9 illustrates a flowchart of a method 500 for visualizing metric related to business performance. The method 500 further comprises the act to provide presentation of the data stored in the raw data master file for tracking the metric related to activity performance.

At act 510, receiving, by the process device, at least one metric and at least one business intelligent plug-in block defined by at least a user, a user defines the metric on a graphical user interface 580 (FIG. 10), wherein at least one user-defined metric and/or raw data and at least one restrictive attribute (either a child attribute in related to the data with a parent attribute or just the parent attribute itself, as a parent-level summary) as well as a time restriction such as from/to date to search in the raw data master file. Thus, through metrics catalog, the user has defined the values for the process device to query and retrieve the data now residing in the RDMF raw data master file. The metric may fall into one of two kinds in terms of the RDMF file. 1) It could be simply from raw data, for example daily sales, revenue etc., to be summarized over week, month, quarter etc., and sliced and diced by store, product, region etc., which are attributes. 2) The metric can be derived data, for example, the net sales booked, which is a formula that involves the calculation of sales minus commissions, minus returns, minus recoveries, minus taxes.

At act 510, the process device receives parameters in Business Intelligent plug-in blocks as the "where" clause in a dynamic Structured Query Language (SQL) statement. By the "where" clause in the SQL statement, the process device retrieves, aggregates, and/or converts the raw data into a limited ranges or conditions, such the range of time, the type of data, the category of data. An example of the dynamic SQL statement is as

```
SELECT DECODE ( getRDDataType ( '$internal_colum$' ),
    '99.99%', ROUND ( NVL ( AVG ($internal_colum$ ), 0 ), 2 ),
    '99%', ROUND ( NVL ( AVG ($internal_colum$ ), 0 ), 2 ),
    ROUND ( NVL ( SUM ($internal_colum$ ), 0 ), 2 ) )
FROM RDMF WHERE 1=1
    ( AND metdate >= '$Var_From_Date$'
    AND metdate <= '$Var_To_Date$' )
        ( AND spattrcat23 = '$Attribute_category$'
        AND spattparent23 = '$Attribute_parent$'
        AND spattrcode23 = '$Attribute_code$' )
AND OUTLIERFLAG = 'N'
```

In the embodiments of the current invention, the BI plug-in blocks have different parameters setting, including but not limited to: raw data, derived data or aggregate expression formula, restricted to time period of data (from date-to date or the rolling view of three months, six months a year etc.,) a combination of attributes and finally, the chart type and cosmetics of the chart. It is important to note these blocks are defined by the user not by the developers. These could be blocks for retrieving and presenting data for timeline trends, multi-attribute time series, pie charts, bar charts, metric list, area charts, image/plug-in, single metric fact, stacked bar charts, pivot chart, value based grid, time-value based grid, time-time based grid, plain comment, and even plain lists of metrics catalog etc.

At the act 520, retrieving a plurality of stored data from the raw data master file, by the process device, in accordance with at least one set of parameters in the at least one business intelligent plug-in block as defined by the user, the process device queries and retrieves a plurality of stored data from RDMF in accordance with metrics and business intelligent plug-in blocks defined in the act 510.

At the act 530, processing the plurality of stored data into a plurality of processed data, by the process device, in accordance with the at least one condition defined in the at least one business intelligent plug-in block, wherein the at least one condition to process the plurality of stored data consisting of filtering, cutting out, combining the plurality of attributes of the plurality of stored data, aggregating, computing, time period, and a combination thereof; the plurality of stored data retrieved by process device in accordance with the BI plug-in blocks and the metrics catalog will be further computed or aggregated according to the predefined rules in the BI plug-in blocks and metrics. Such predefined rules could be, but not limited to, the metrics catalog limit set conditions, Red/Yellow/Green alerts for outliers.

In one of the embodiments, the act 530 is called the Master KPI definition process wherein the Red/Yellow/Green limits are called Service Level Agreements (SLAs) linked to Benchmarking, and the act 530 includes archival and retirement of metrics that are no longer in use.

At the act 540, generating, by the process device, a set of graphical presentations of the plurality of processed data consisting of charts, graphs, reports, and tables, and a combination thereof; the one embodiment of the BI plug-in blocks may be programmed to transfer the plurality of processed data in the act 540 further into XML/JSON strings, and passed on to external graphing software to build and pass back the graphical presentation for timeline trends, multi-attribute time series, pie charts, bar charts, metric list, area charts, image/plug-in, single metric fact, stacked bar charts, pivot chart, value based grid, time-value based grid, time-time based grid, plain comment, and even plain table lists of metrics etc.

Figure 11:
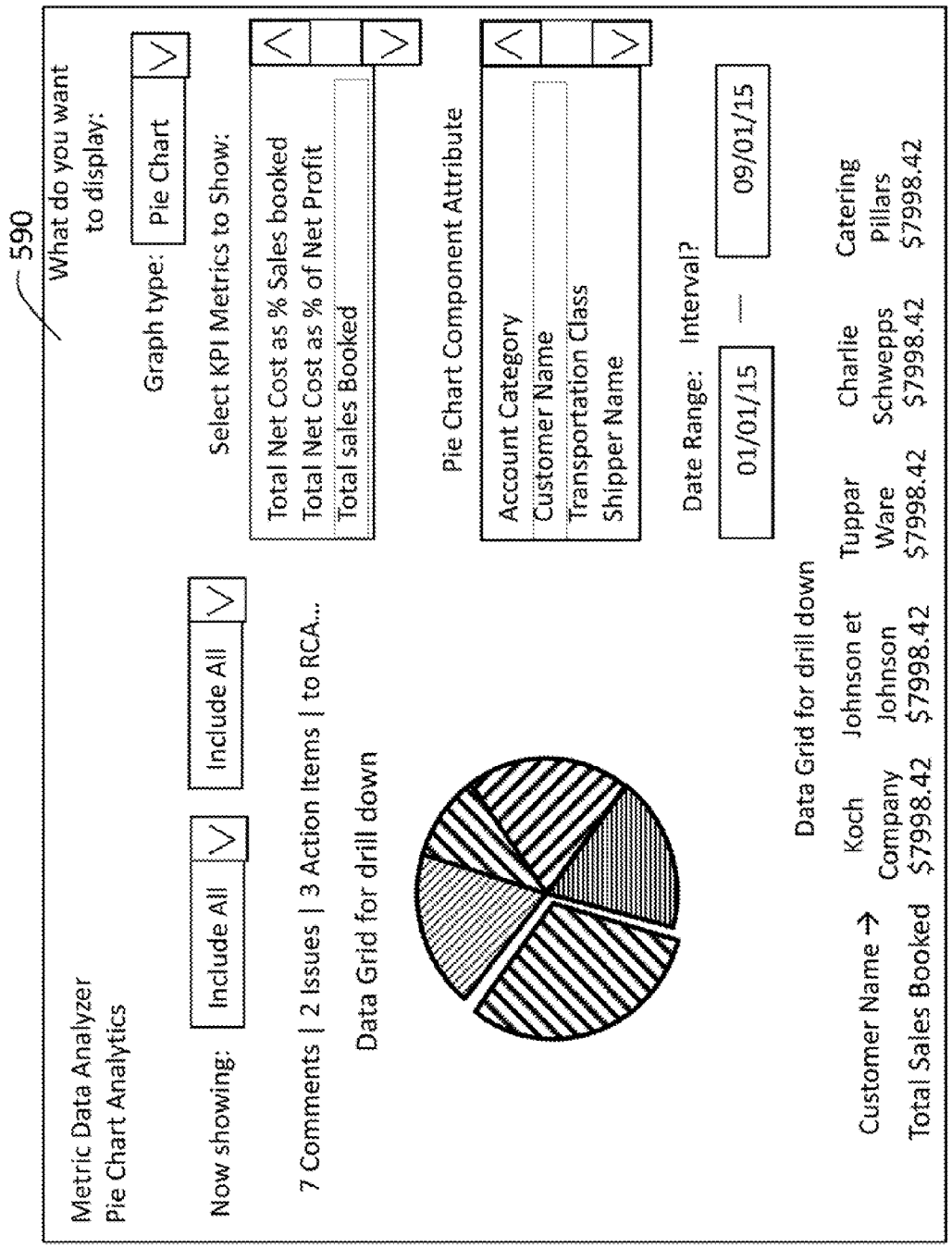
FIG. 11 illustrates an exemplary graphical user interface for defining and operating business intelligent plug-in blocks and in accordance with an aspect of the subject invention.
Figure 12:
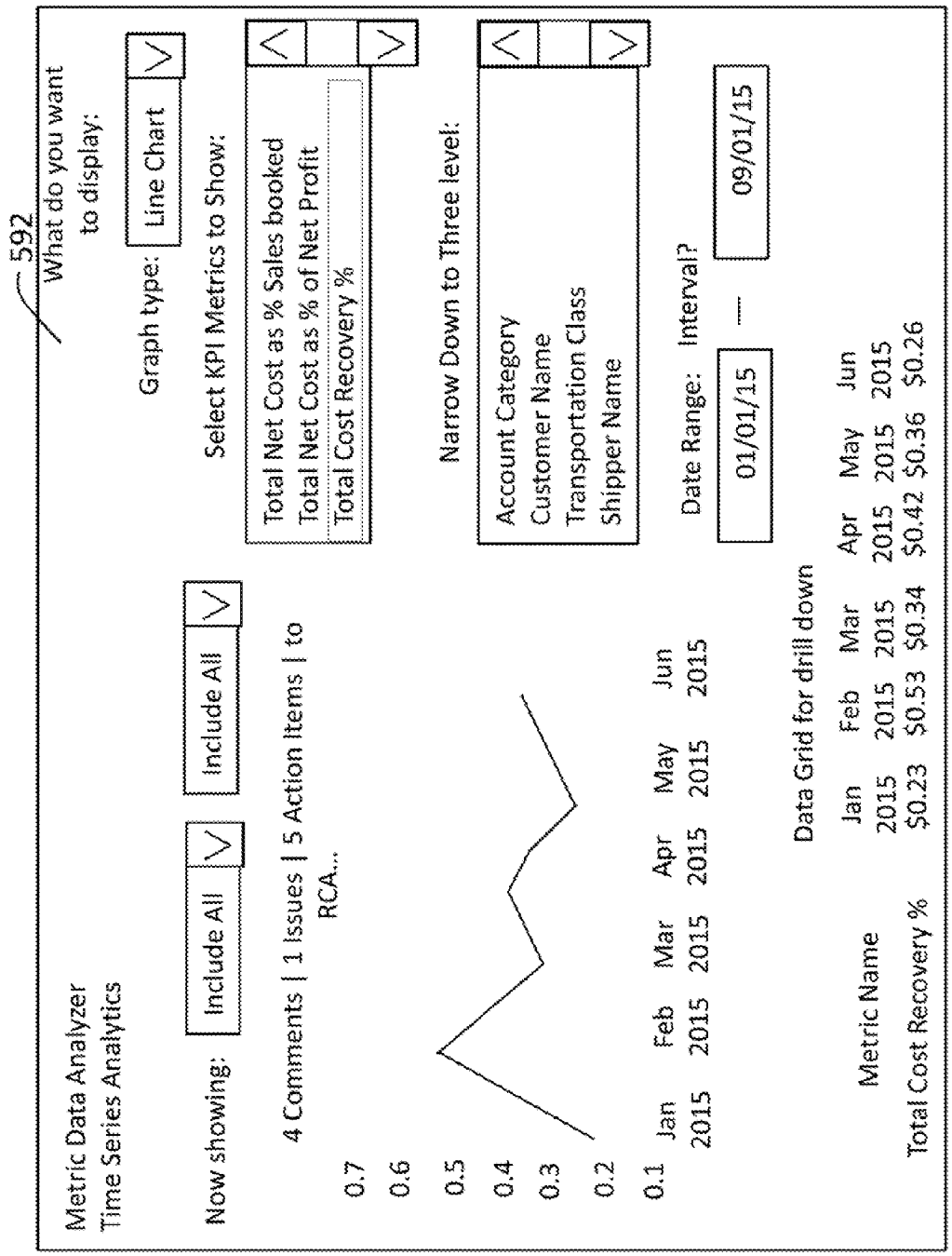
FIG. 12 illustrates another exemplary graphical user interface for defining and operating business intelligent plug-in blocks and in accordance with an aspect of the subject invention.

At act 550, providing the set of graphical presentations on a display device, examples from the embodiments of the set of graphical presentations as shown on FIG. 11 and FIG. 12 will be displayed on a display device, such as computer screens. Bundled in the graphical presentation would be: the links (such as URL links) to drill down and the pointer placeholders to collaborative aspect (to connect this graphical presentation to comment threads, issues, action items etc.,). Together, the graphical representation, the drill down links, and the placeholder links for future collaboration etc., all form a reusable building block. Examples of the graphical presentation are shown on FIG. 11 (pie chart) and FIG. 12 (time trends).

Also at act 550, the user can save this entire building block for later reuse. In addition, these blocks could be arranged in a hierarchical fashion, or grid structures the user can define. The reuse could be but not limited to: embedding them in dashboards or other relevant web sites and artifacts to measure business performance. The metrics and the BI plug-in block can be used in representations such as the Balanced Scorecard quadrants, which are, until now, performed as independent management initiatives aside from analytics. In one of the embodiments, the act 550 is further refined to include dashboard template creation involving sections (aka Tabs) and subsections (aka Subtabs), dashboard access rules for deploying dashboards to different types of users.

Figure 13:
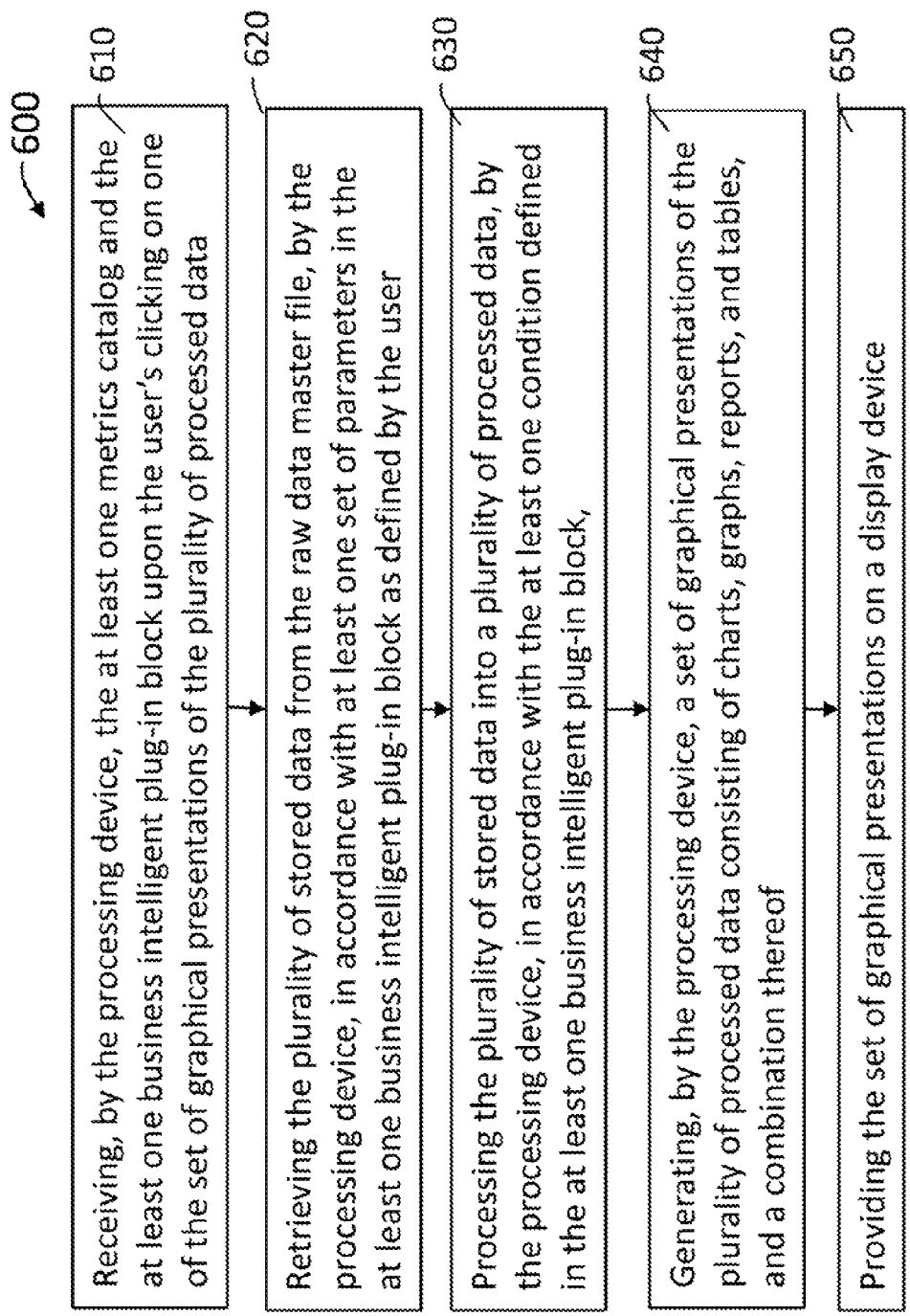
FIG. 13 is a flow chart diagram of a method for defining and operating of drill down business intelligent plug-in blocks in accordance with an aspect of the present invention.

FIG. 13 illustrates a flowchart of a method 600 for transforming and tracking activity performance which originated from raw data source 310 and now stored in raw data master file. The method 600 further comprises the acts to provide drill down of the data presented by the BI plug-in blocks in the group of steps 600.

At act 610, receiving, by the process device, the at least one metric and the at least one business intelligent plug-in block upon the user's clicking on one of the set of graphical presentations of the plurality of processed data, wherein the at least one metric comprises at least one query to retrieve the plurality of stored data with a child attribute in related to the plurality of processed data with a parent attribute; the process device receives at least one user-defined metric and/or raw data, restrictive time-period (from date-to date or rolling view) and at least one attribute either as a parent or child—all of these upon a user clicking on the graphical presentation. At the act 610, the graphical presentation offers one of a plurality of ways for the user to drill down: They are: A) time-based drill down, which can present the data from a one long time frame interval to shorter time frame, such as drilling down from a quarterly to monthly view; B) attribute drill down, where, from the data already presented in a higher category view, such as continents (Europe), to a lower subcategory data view, such as countries (France, Germany . . . ) in a specific continent; C) component-based drill down, which can provide a presentation from a high aggregated data level to detailed data level constituting the aggregated data, such as from a view of net sale down to a view of the components of gross sales, refunds, and discounts that constitute the net sale; and the view down to the actual data constituting the view presented by the BI plug-in blocks in the method 500. The BI plug-in blocks 114 (FIG. 1) at the act 620 can be defined by the user 200 (FIG. 1) to retrieve data from the RDMF beginning from aggregated data to its breakdown data constituting the aggregated data, which is called drill down. If the breakdown data is also an aggregated data that are from a further breakdown data, the drill down can continue and go on iteratively. This iterative drill down can be defined to retrieve data from the most original forms that have been originally input from the raw data source into the RDMF by the method 400 as shown on FIG. 6. For example, the sales data in a BI plug-in block is shown as an aggregated sales data for the sales in Asia and Europe. Then the aggregated sales data in Europe can be drill down to show individual sales data in individual countries, such as France and Germany within Europe. If there is a raw data source containing sales data from the sales in different cities, like Paris and Nice in France, then the drill down can continue down from France to show the individual sales data from the sales in Paris and in Nice.

At the act 620, retrieving the plurality of stored data from the raw data master file, by the process device, in accordance with at least one set of parameters in the at least one business intelligent plug-in block as defined by the use, the process device queries and retrieves data in accordance with the act 620.

At the act 630, processing the plurality of stored data into a plurality of processed data, by the processing device, in accordance with the at least one condition defined in the at least one business intelligent plug-in block, wherein the at least one condition to process the plurality of stored data consisting of filtering, cutting out, combining the plurality of attributes of the plurality of stored data, aggregating, computing, and a combination thereof; the data retrieved by process device in accordance with the BI plug-in blocks and the metrics catalog will be further computed or aggregated according to the predefined rules in the BI plug-in blocks. Such predefined rules could be, but not limited to, the metrics limit set conditions, Red/Yellow/Green alerts for outliers.

At the act 640, generating, by the processing device, a set of graphical presentations of the plurality of processed data consisting of charts, graphs, reports, and tables, and a combination thereof; in one embodiment, the BI plug-in blocks may be programmed to transfer the retrieved data into XML/JSON strings, and passed on to external graphing software to build and pass back the graphical presentation for timeline trends, multi-attribute time series, pie charts, bar charts, metric list, area charts, image/plug-in, single metric fact, stacked bar charts, pivot chart, value based grid, time-value based grid, time-time based grid, plain comment, and even plain table lists of metrics etc.

At act 650, providing the graphical presentation on a display device, the graphical presentation as shown on FIG. 11 and FIG. 12 will be displayed on a display device, such as computer screens. Bundled in the graphical presentation would be: the links (such as URL links) to drill down and the pointer placeholders to collaborative aspects (to connect this graphical presentation to comment threads, issues, action items etc.). Together, the graphical representation, the drill down links, and the placeholder links for future collaboration etc., all form a reusable building block. Examples of the graphical presentation of a pie chart 590 are shown on FIG. 11 and a time trends 592 FIG. 12. Also at act 650, the user can save this entire building block for later reuse. In addition, these blocks could be arranged in a hierarchical fashion, or grid structures the user can define. The reuse could be but not limited to: embedding them in dashboards or other relevant web sites and artifacts to measure business performance. The metrics catalog and the building intelligent plug-in blocks can be used in representations such as the Balanced Scorecard quadrants, which are, until now, performed as independent management initiatives aside from analytics.

Figure 14:
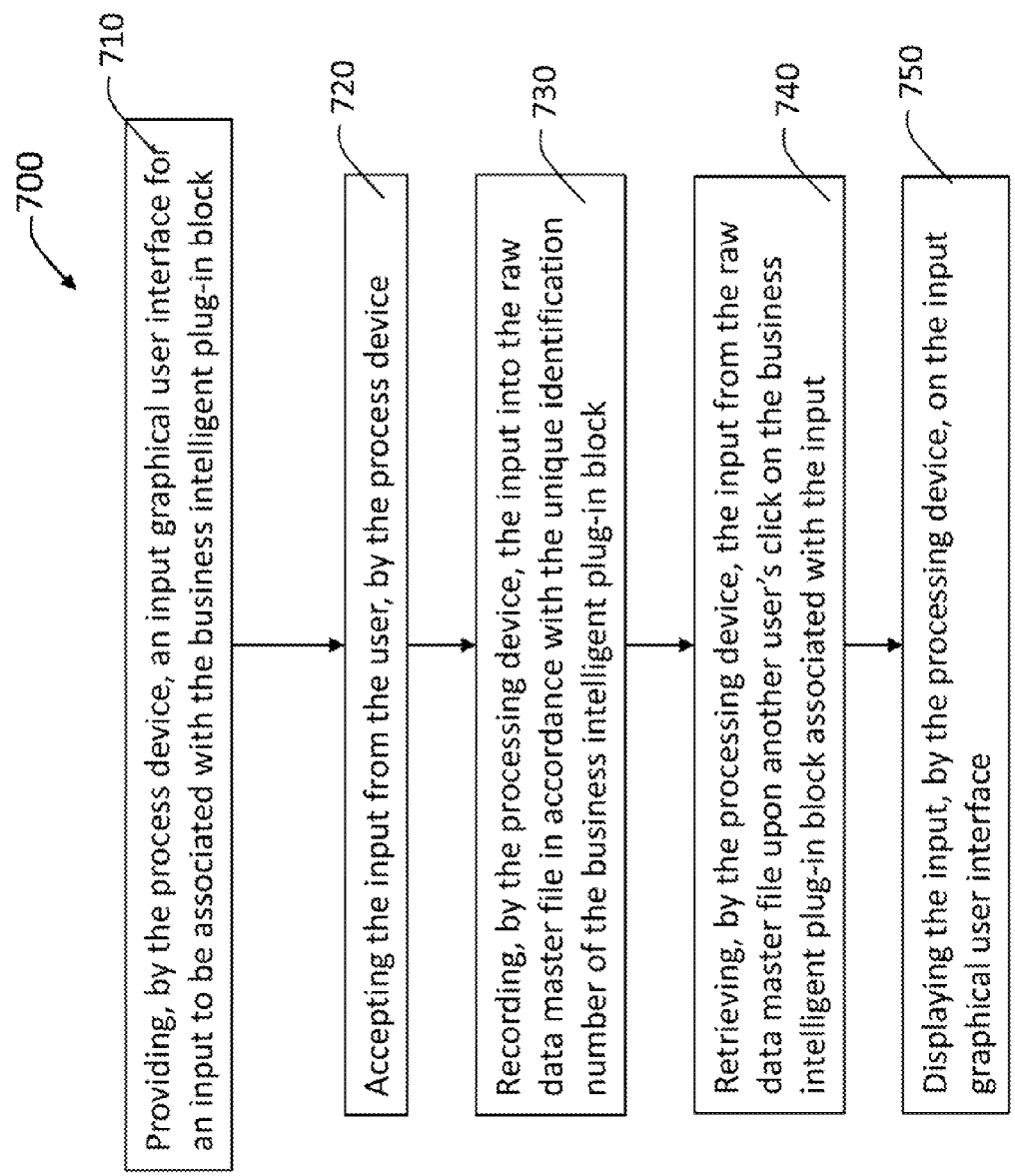
FIG. 14 is a flow chart diagram of a method for defining and operating of collaboration in accordance with an aspect of the present invention.

Referring to FIG. 14 illustrating a flowchart of a method 700 for collaborating among business users, the users 200 and 220 (FIG. 1) are working through the collaboration module 120, upon the user visualizing metrics trends and charts information from raw data source using methods 500 and 600, during the course of an analytics session.

At act 710, providing, by the process device, an input graphical user interface for an input to be associated with the business intelligent plug-in block, wherein the input graphical user interface is associated with a unique identification number of the business intelligent plug-in block, by using that "Block ID" as a foreign key, the user can associate the foreign key, for example, with a business issue the user would like to record, route and track, using a business process of their own. Such an issue tracking business process/system could be external to process device 40. The process device 40 suffices by supplying the ID intuitively upon clicking for example, the "issue" link and the process device helps seamless navigation for the user to go and manage the "Issue" associated with the "activity performance metrics" and collaborate with other business users and return to the BI plug-in block within process device 40, defined by the user 200.

At act 720, accepting the input from the user, by the process device, the process device, for example, the computer, navigates as appropriate, to accept and process the user's input of issues. The processing of the issue could be external or internal to the process device 40.

In one embodiment, at act 730, recording, by the processing device, the input into the raw data master file in accordance with the unique identification number of the business intelligent plug-in block, the process device records the issue the user input into the RDMF in accordance with the identification of the BI plug-in block. By this association and record, all the business issues associated with the metrics can be tracked with the specific block and the data associated with the BI plug-in block.

Similarly, under act 710, act 720, and act 730, the users can create other pertinent collaborative actions: such as but not limited to: comment threads, action item tracking, milestone progress tracking specific to every target metric, and root cause analysis—all tagged via the unique identification number of the BI plug-in block to the respective specific identifications of every issue, action item, comment thread, milestone etc., and be able to track them seamlessly, to give a full business intelligence experience and a business process to govern the business by metrics.

At act 740, retrieving, by the processing device, the input from the raw data master file upon another user's click on the business intelligent plug-in block associated with the input, another user can view the recorded issues and tracking by clicking on the BI plug-in block that are associated with the issues and tracking.

At act 750, displaying the input, by the processing device, on the input graphical user interface, those recorded issue and tracking can be displayed on a display, such as computer display. End Users can have comment threads built, all tagged to a specific block identification number and it will display all collaboration.

In another embodiment of method 700, the users can create and schedule period online meetings—every week or month. Prior to every meeting, the system would create Meeting Agenda with all escalated issues, open action items, and milestone progress. From the collaboration achieved under method 700, users can conduct meetings, address issues, action items, milestones one after the other and take notes, make decisions and throw new action items and resolve issues. At the end of the meeting, the text input into the process device can be stored into the RDMF for future use, in addition to being distributed as reports such as PDF reports or online meeting minutes.

In one of the embodiments, the acts 400, 480, 490, 500, 600 and 700 may be combined and reorganized into a logical sequence of acts towards metrics data collection, aggregation, reporting and decision-making. They sequence of acts are: collect, construct, publish, subscribe, analyze and decide.

What claimed is:

1. A system for integrated performance measurement environment, comprising:
   a plurality of distributed file systems storing a plurality of raw data sources;
   a database receiving a plurality of raw data from the plurality of raw data source and assigning a plurality of attributes to the plurality of raw data, wherein the database further comprises a layout details table, a layout definition table, and at least one raw data master file, wherein the raw data is stored in the at least one raw data master file, wherein the at least one raw data master file is denormalized;
   at least one network capable of transmitting the plurality of raw data from the plurality of raw data source to a process device;
   an extract-transform-load module in a memory of the process device, which extracts, transforms, and loads the plurality of raw data into the database in accordance with a set of instructions in the extract-transform-load module;
   a business logic module in the memory of the process device, which comprises a plurality of metrics and a plurality of business intelligent plug-in blocks to retrieve, filter, aggregate, convert, and display a plurality of data stored in the at least one raw data master file, wherein the business intelligent plug-in blocks further comprises at least one condition to process a plurality of stored data consisting of filtering, cutting out, combining a plurality of attributes of the plurality of stored data, aggregating, computing, time period, and a combination thereof;
   a collaboration module in the memory of the process device, wherein the collaboration module further comprises a plurality of comment threads, an issue escalation system, an action item tracking, a milestone status tracking, and a plurality of root cause analysis process;
   at least one graphical user interface, wherein an end user operates the at least one graphical user interface to define a format specification of a plurality of raw data to specify the format specification of the plurality of raw data in the plurality of raw data source; and
   a set of graphical presentations of a plurality of processed data consisting of charts, graphs, reports, and tables, and a combination thereof, wherein the set of graphical presentations of a plurality of processed data is on the display device.

2. The system of claim 1 further comprising an online meeting module in the memory.

3. A method for integrated performance measurement environment, comprising:
   providing, by a process device, at least one graphical user interface for a user to define format specification of a plurality of raw data to specify the format specification of the plurality of raw data in at least one raw data source;
   receiving, by a process device, the format specification of the plurality of raw data in the at least one raw data source, wherein the plurality of raw data comprises at least one row, at least one column, and at least one value in accordance with the at least one row and the at least one column, wherein the format of specification comprises a plurality of rules for an extract, transform, and load (ETL) operation;
   receiving, by the process device, a plurality of raw-data-process-instructions in the ETL operation, wherein the plurality of raw-data-process-instructions comprises the plurality of rules to reject an abnormality in the raw data and alert a user for the abnormality in the raw data;
   receiving the plurality of raw data to be interpreted as an input from the at least one raw data source;
   executing, by the process device, the ETL operation, wherein the ETL operation further comprises
   an extract process comprising selecting from the plurality of raw data,
   one or more transformation processes to aggregate and formulate the plurality of raw data, and
   a load process comprising loading the plurality of raw data into a raw data master file by an order of the at least one row of the at least one raw data source in accordance with the format specification of the plurality of raw data;
   processing the plurality of raw data and storing the plurality of raw data into appropriate locations in the raw data master file by mapping the plurality of raw data, and a plurality of attribute associated with the plurality of raw data into a prebuilt data dictionary structure;
   generating, by the process device, a set of graphical presentations of the plurality of processed data consisting of charts, graphs, reports, and tables, and a combination thereof; and
   providing the set of graphical presentations on a display device.

4. The method of claim 3, further comprising:
   receiving, by the process device, at least one metric and at least one business intelligent plug-in block defined by at least a user;
   retrieving a plurality of stored data from the raw data master file, by the process device, in accordance with at least one set of parameters in the at least one business intelligent plug-in block as defined by the user;
   processing the plurality of stored data into a plurality of processed data, by the process device, in accordance with the at least one condition defined in the at least one business intelligent plug-in block, wherein the at least one condition to process the plurality of stored data consisting of filtering, cutting out, combining the plurality of attributes of the plurality of stored data, aggregating, computing, time period, and a combination thereof;
   generating, by the process device, a set of graphical presentations of the plurality of processed data consisting of charts, graphs, reports, and tables, and a combination thereof; and
   providing the set of graphical presentations on a display device.

5. The method of claim 4, further comprising:
   receiving, by the process device, the at least one metric and the at least one business intelligent plug-in block upon clicking, the user, on one of the set of graphical presentations of the plurality of processed data, wherein the at least one metric comprises at least one query to retrieve the plurality of stored data with a child attribute in related to the plurality of processed data with a parent attribute;

retrieving the plurality of stored data from the raw data master file, by the process device, in accordance with at least one set of parameters in the at least one business intelligent plug-in block as defined by the user; and processing the plurality of stored data into a plurality of processed data, by the process device, in accordance with the at least one condition defined in the at least one business intelligent plug-in block, wherein the at least one condition to process the plurality of stored data consisting of filtering, cutting out, combining the plurality of attributes of the plurality of stored data, aggregating, computing, and a combination thereof.

6. The method of claim 4, further comprising:

providing, by the process device, an input graphical user interface for an input to be associated with the business intelligent plug-in block, wherein the input graphical user interface is associated with a unique identification number of the business intelligent plug-in block;

accepting the input from the user, by the process device;

recording, by the process device, the input into the raw data master file in accordance with the unique identification number of the business intelligent plug-in block;

retrieving, by the process device, the input from the raw data master file upon another user clicking on the business intelligent plug-in block associated with the input; and displaying the input, by the process device, on the input graphical user interface.

7. A method for integrated performance measurement environment, comprising:

providing, by a process device, at least one graphical user interface for a user to define format specification of a plurality of raw data to specify the format specification of the plurality of raw data in at least one raw data source;

receiving, by a process device, the format specification of the plurality of raw data in the at least one raw data source, wherein the plurality of raw data comprises at least one row, at least one column, and at least one value in accordance with the at least one row and the at least one column, wherein the format of specification comprises a plurality of rules for an extract, transform, and load (ETL) operation;

receiving, by the process device, the plurality of raw-data-process-instruction in the ETL operation, wherein the plurality of raw-data-process-instruction comprises the plurality of rules to reject an abnormality in the raw data and alert a user for the abnormality in the raw data;

receiving the plurality of raw data to be interpreted as an input from the at least one raw data source;

executing, by the process device, the ETL operation, wherein the ETL operation further comprises
   an extract process comprising selecting from the plurality of raw data,
   one or more transformation processes to aggregate and formulate the plurality of raw data, and
   a load process comprising loading the plurality of raw data into a raw data master file by an order of the at least one row of the at least one raw data source in accordance with the format specification of the plurality of raw data;

processing the plurality of raw data and storing the plurality of raw data into appropriate locations in the raw data master file by mapping the plurality of raw data, and a plurality of attribute associated with the plurality of raw data into a prebuilt data dictionary structure;

receiving, by the process device, at least one metric and at least one business intelligent plug-in block defined by at least a user;

retrieving a plurality of stored data from the raw data master file, by the process device, in accordance with at least one set of parameters in the at least one business intelligent plug-in block as defined by the user;

processing the plurality of stored data into a plurality of processed data, by the process device, in accordance with the at least one condition defined in the at least one business intelligent plug-in block, wherein the at least one condition to process the plurality of stored data consisting of filtering, cutting out, combining the plurality of attributes of the plurality of stored data, aggregating, computing, time period, and a combination thereof;

generating, by the process device, a set of graphical presentations of the plurality of processed data consisting of charts, graphs, reports, and tables, and a combination thereof;

providing the set of graphical presentations on a display device;

receiving, by the process device, the at least one metric and the at least one business intelligent plug-in block upon the user clicking on one of the set of graphical presentations of the plurality of processed data, wherein the at least one metric comprises at least one query to retrieve the plurality of stored data with a child attribute in related to the plurality of processed data with a parent attribute;

retrieving the plurality of stored data from the raw data master file, by the process device, in accordance with at least one set of parameters in the at least one business intelligent plug-in block as defined by the user;

processing the plurality of stored data into a plurality of processed data, by the process device, in accordance with the at least one condition defined in the at least one business intelligent plug-in block, wherein the at least one condition to process the plurality of stored data consisting of filtering, cutting out, combining the plurality of attributes of the plurality of stored data, aggregating, computing, and a combination thereof;

generating, by the process device, a set of graphical presentations of the plurality of processed data consisting of charts, graphs, reports, and tables, and a combination thereof; and providing the set of graphical presentations on a display device.

8. The method of claim 7, further comprising:

providing, by the process device, an input graphical user interface for an input to be associated with the business intelligent plug-in block, wherein the input graphical user interface is associated with a unique identification number of the business intelligent plug-in block;

accepting the input from the user, by the process device;

recording, by the process device, the input into the raw data master file in accordance with the unique identification number of the business intelligent plug-in block;

retrieving, by the process device, the input from the raw data master file upon another user clicking on the business intelligent plug-in block associated with the input; and displaying the input, by the process device, on the input graphical user interface.

* * * * *